US010686893B2

United States Patent
Nagasaki

(10) Patent No.: US 10,686,893 B2
(45) Date of Patent: Jun. 16, 2020

(54) MEDIATION SERVER REGISTERING IDENTIFICATION INFORMATION FOR FIRST COMMUNICATION APPARATUS AND PERFORMING MEDIATION COMMUNICATION BETWEEN SERVICE PROVIDER SERVER AND SECOND COMMUNICATION APPARATUS

(71) Applicant: Brother Kogyo Kabushiki Kaisha, Nagoya-shi, Aichi-ken (JP)

(72) Inventor: Takeshi Nagasaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 114 days.

(21) Appl. No.: 15/473,675

(22) Filed: Mar. 30, 2017

(65) Prior Publication Data
US 2017/0289276 A1  Oct. 5, 2017

(30) Foreign Application Priority Data

Mar. 30, 2016  (JP) .................................. 2016-068807

(51) Int. Cl.
*H04L 29/08*  (2006.01)
(52) U.S. Cl.
CPC .............. *H04L 67/16* (2013.01); *H04L 67/10* (2013.01)
(58) Field of Classification Search
None
See application file for complete search history.

(56) References Cited

U.S. PATENT DOCUMENTS 7,685,414 B1 * 3/2010 Appenzeller ......... H04L 9/3073
380/282
9,232,083 B2    1/2016 Miyazawa et al.
(Continued)

FOREIGN PATENT DOCUMENTS

JP    2010-191807 A    9/2010
JP    2010-211503 A    9/2010
(Continued)

OTHER PUBLICATIONS

Truica et al., Asynchronous Repulication in Microsft SQL Server, PostgreSQL and MySOL, 2013 International Conference on Cyber Sciences and Engineering (CyberSE 2013), pp. 50-55 (Year: 2013).*
(Continued)

*Primary Examiner* — Luu T Pham
*Assistant Examiner* — Edward X Long
(74) *Attorney, Agent, or Firm* — Banner & Witcoff, Ltd.

(57) ABSTRACT

The mediation server registers identification information and authentication information to be associated with each other when a registration request is received from a first communication apparatus. The authentication information is for the first communication apparatus to be authenticated for using a first utilization target. The identification information is for using the second utilization target. The server outputs the identification information to an outputting destination without outputting the authentication information. The outputted identification information is available for a second communication apparatus. The server performs, in a case where a first utilization request including the identification information is received from the second communication apparatus, mediation communication in which a specific service from the service provider server to the second communication apparatus is mediate. The mediation communication includes first communication with the service
(Continued)

provider server, and second communication with the second communication apparatus. The second communication is performed without using the authentication information.

14 Claims, 7 Drawing Sheets

(56) References Cited

U.S. PATENT DOCUMENTS

| | | | |
|---|---|---|---|
| 2012/0331518 A1* | 12/2012 | Lee | G06F 21/33 726/1 |
| 2013/0135640 A1* | 5/2013 | Nagasaki | G06F 3/122 358/1.11 |
| 2013/0135643 A1* | 5/2013 | Nagasaki | G06F 3/1211 358/1.13 |
| 2013/0141743 A1 | 6/2013 | Miyazawa et al. | |
| 2014/0189038 A1* | 7/2014 | Saito | H04L 67/1097 709/213 |
| 2016/0080601 A1 | 3/2016 | Miyazawa et al. | |

FOREIGN PATENT DOCUMENTS

| | | |
|---|---|---|
| JP | 2013-110716 A | 6/2013 |
| JP | 2013-118558 A | 6/2013 |

OTHER PUBLICATIONS

Richard Vines, From in-house printing to document workflow, 2006, Nippa Whitepaper sponsored by Canon Australia, pp. 1-74 (Year: 2006).*

Dec. 24, 2019—(JP) Notice of Reasons for Refusal—App 2016-068807, Eng Tran.

* cited by examiner

FIG. 2

SHARE TABLE 68

SHARE INFORMATION

| SERVICE NAME | DISPLAY NAME | ACCESS TOKEN | MEMBER ADDRESS | SHARING TARGET | EXECUTION AUTHORITY | EXPIRATION DATE | SHARE ID |
|---|---|---|---|---|---|---|---|
| SV1 | Ken | AT1 | xxx@xxx.com | F1 | UL/DL | 2016.xx.xx | SID1 |
| SV1 | Ken | AT1 | xxx@xxx.com | Img02 | DL | 2016.xx.xx | SID2 |
| ... | ... | ... | ... | ... | ... | ... | ... |

68a → SHARE ID column
68b → (arrow indicator)

DATA TABLE 102

UPLOAD DATA

| ACCOUNT INFO | ACCESS TOKEN | UPLOAD DATA |
|---|---|---|
| AC1 | AT1 | FOLDER 200: FOLDER NAME "FN1", FOLDER ID "F1"; IMAGE FILE 202: FILE NAME "IN01", FILE ID "Img01"; IMAGE FILE 204: FILE NAME "IN02", FILE ID "Img02"; ... FOLDER 300: FOLDER NAME "FN2", FOLDER ID "F2"; IMAGE FILE 302: FILE NAME "IN11", FILE ID "Img11"; IMAGE FILE 304: FILE NAME "IN12", FILE ID "Img12"; ... |
| AC2 | AT2 | ... |
| ... | ... | ... |

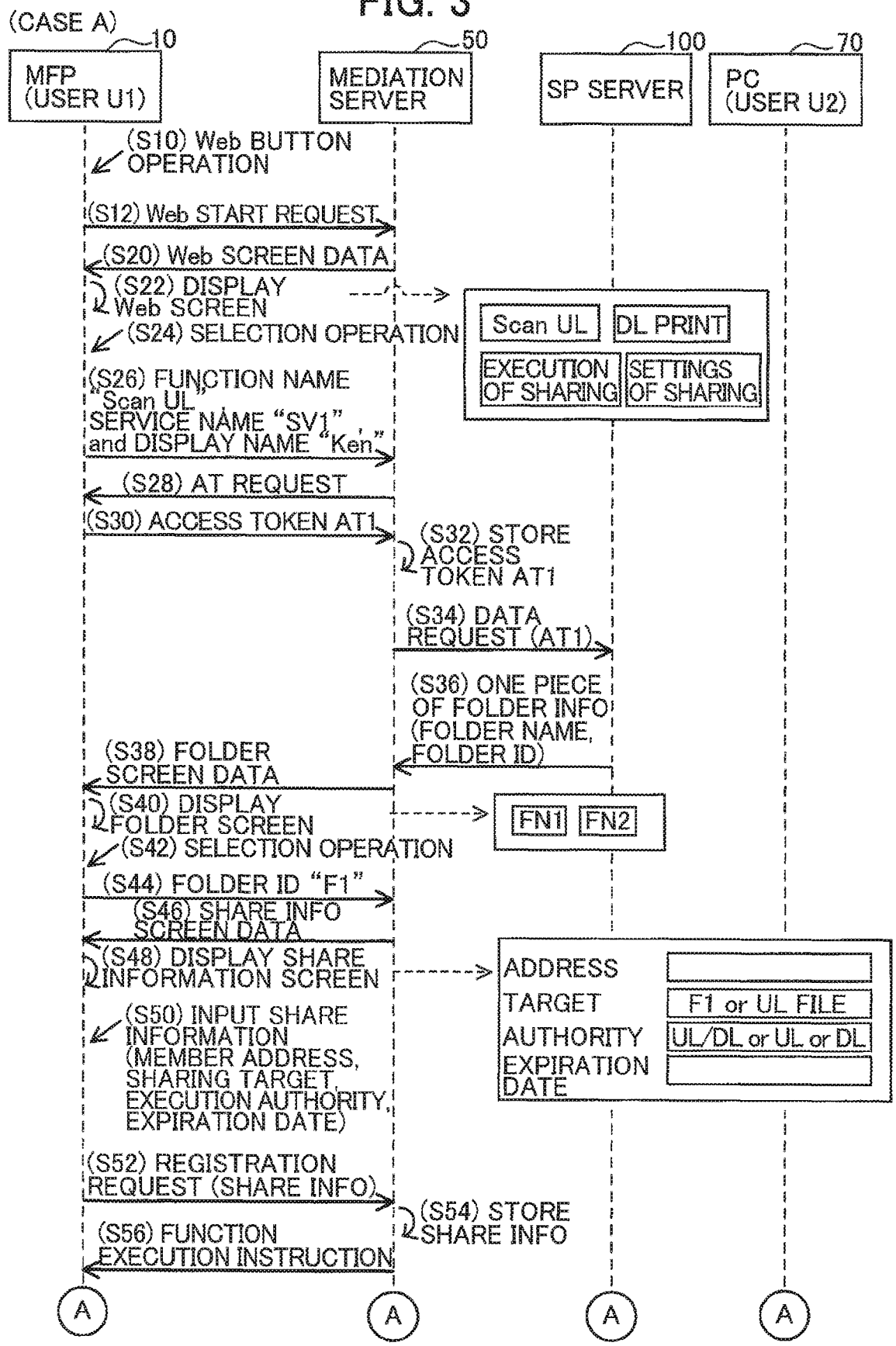

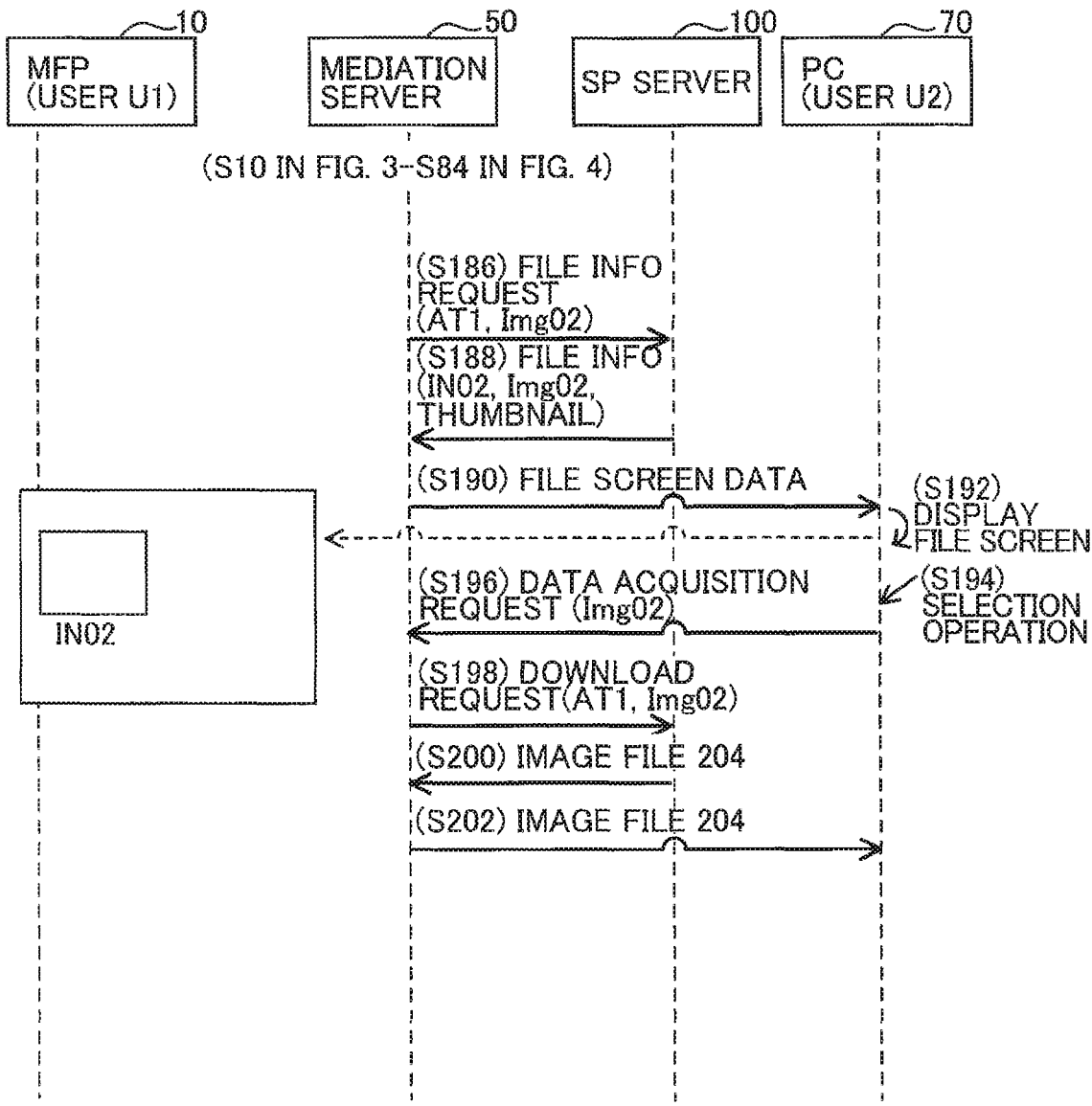

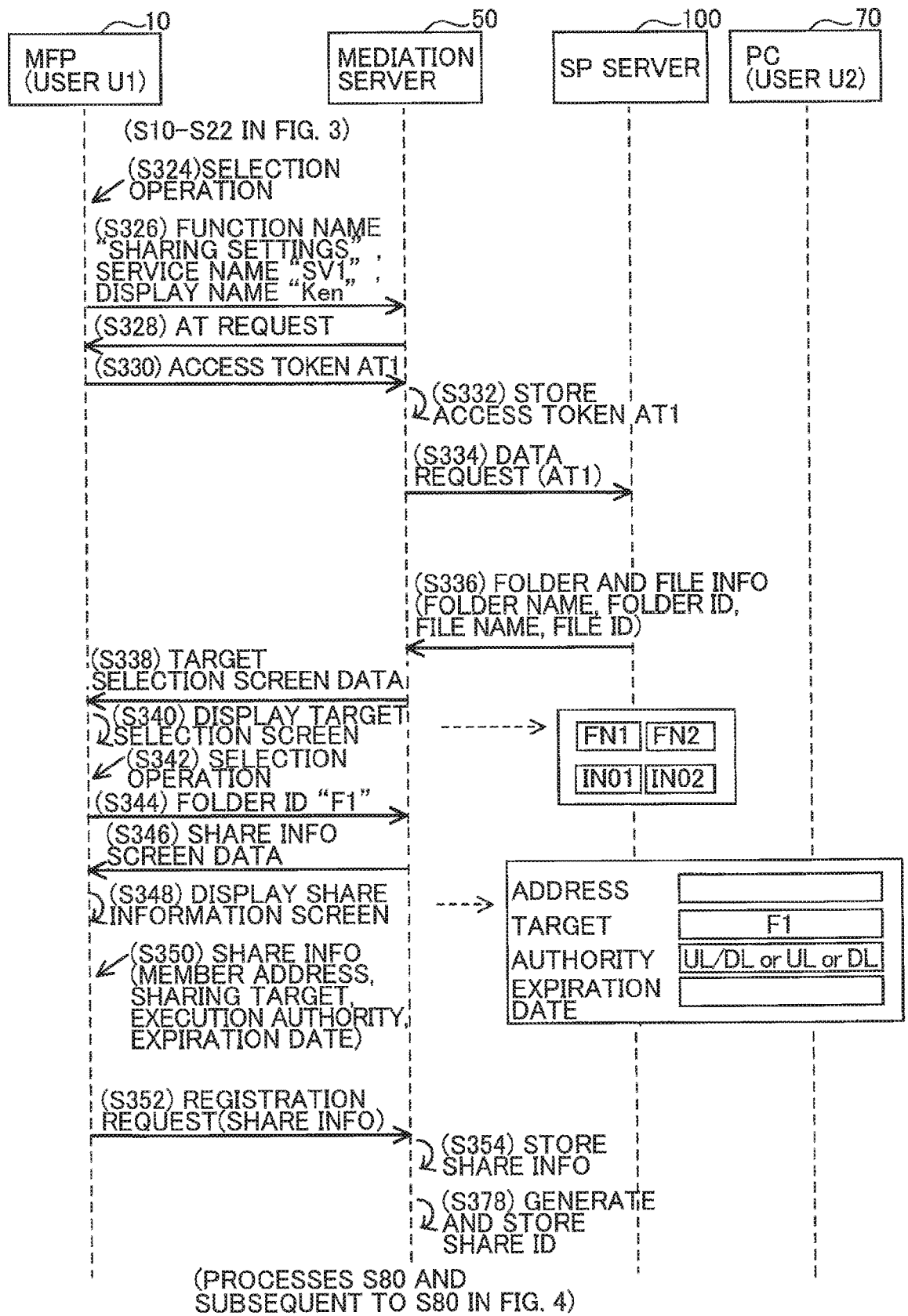

MEDIATION SERVER REGISTERING IDENTIFICATION INFORMATION FOR FIRST COMMUNICATION APPARATUS AND PERFORMING MEDIATION COMMUNICATION BETWEEN SERVICE PROVIDER SERVER AND SECOND COMMUNICATION APPARATUS

CROSS REFERENCE TO RELATED APPLICATION

This application claims priority from Japanese Patent Application No. 2016-068807 filed Mar. 30, 2016. The entire content of the priority application is incorporated herein by reference.

TECHNICAL FIELD

The present disclosure relates to an mediation server for mediating a service from a service provider server to a communication apparatus.

BACKGROUND

In a conventional communication system, account information is registered in a service provider server for a user of a multifunction peripheral. In this system, the user performs authentication procedures by accessing an mediation server via a personal computer and inputting the account information to the service provider server via the mediation server. When the authentication is successful, the service provider server generates an access token corresponding to the account information and transmits the access token to the multifunction peripheral via the mediation server. The multifunction peripheral transmits the access token to the mediation server when accessing a folder which corresponds to the account information and is stored in the service provider apparatus. The mediation server allows the service provider server to perform authentication using the access token. When this authentication is successful, the service provider server transmits data in the folder to the multifunction peripheral.

SUMMARY

There can be a necessity that a folder and a file, which corresponds to first account information for a first user, are used by a second user as well as the first user. To achieve this management of the folder and the file, the second user needs to register second account information for the second user into the service provider apparatus, for example. That is, the second user needs to directly access the service provider server.

In view of the foregoing, it is an object of the invention to provide a technique enabling a user to use an object corresponding to account information of another user without accessing the service provider server.

In order to attain the above and other objects, the disclosure provides a mediation server. The mediation server includes a communication interface, a processor, and a memory. The communication interface communicable with a service provider server, a first communication apparatus, and a second communication apparatus different from the first communication apparatus. The service provider server has a first utilization target associated with specific account information. the first utilization target includes a second utilization target. The memory stores computer-readable instructions therein. The computer-readable instructions, when executed by the processor, causes the mediation server to: acquire authentication information associated with the specific account information, the authentication information being for the first communication apparatus to be authenticated for using the first utilization target; register identification information and the authentication information so as to be associated with each other in the memory in a case where a registration request is received from the first communication apparatus, the identification information being for using the second utilization target; output the identification information to an outputting destination without outputting the authentication information to the outputting destination; and perform, in a case where a first utilization request including the identification information is received from the second communication apparatus after outputting the identification information, mediation communication in which a specific service from the service provider server to the second communication apparatus is mediated, the specific service using the second utilization target in the service provider server, wherein the mediation communication includes first communication between the communication interface and the service provider server, and second communication between the communication interface and the second communication apparatus, the first communication being performed using the authentication information which is associated with the identification information stored in the memory, the second communication being performed without using the authentication information.

According to another aspects, the disclosure provides a non-transitory computer readable storage medium storing a set of program instructions thereon that, when executed by a computer for controlling a mediation server, which is communicable with a service provider server having a first utilization target associated with specific account information, a first communication apparatus, and a second communication apparatus different from the first communication apparatus, the set of program instruction includes: acquiring authentication information associated with the specific account information, the authentication information being for the first communication apparatus to be authenticated for using the first utilization target, the first utilization target including a second utilization target; registering identification information and the authentication information associated with each other in a memory in a case where a registration request is received from the first communication apparatus, the identification information being used for using the second utilization target; outputting the identification information to an outputting destination without outputting the authentication information to the outputting destination; and performing, in a case where a first utilization request including the identification information is received from the second communication apparatus after outputting the identification information, mediation communication in which a specific service from the service provider server to the second communication apparatus is mediated, the specific service using the second utilization target in the service provider server, wherein the mediation communication includes first communication between the communication interface and the service provider server, and second communication between the communication interface and the second communication apparatus, the first communication being performed using the authentication information which is associated with the identification information stored in the memory, the second communication being performed without using the authentication information.

According to still another aspects, the disclosure provides a mediation server. The mediation server includes a communication interface, and a memory. The communication interface is communicable with a service provider server, a first communication apparatus, and a second communication apparatus different from the first communication apparatus. The service provider server has a first utilization target associated with specific account information. The first utilization target includes a second utilization target. The mediation server further includes: acquiring means for acquiring authentication information associated with the specific account information, the authentication information being for the first communication apparatus to be authenticated for using the first utilization target, the first utilization target including a second utilization target; registering means for registering identification information and the authentication information associated with each other in a memory in a case where a registration request is received from the first communication apparatus, the identification information being used for using the second utilization target; outputting means for outputting the identification information to an outputting destination without outputting the authentication information to the outputting destination; and performing means for performing, in a case where a first utilization request including the identification information is received from the second communication apparatus after outputting the identification information, mediation communication in which a specific service from the service provider server to the second communication apparatus is mediated, the specific service using the second utilization target in the service provider server, wherein the mediation communication includes first communication between the communication interface and the service provider server, and second communication between the communication interface and the second communication apparatus, the first communication being performed using the authentication information which is associated with the identification information stored in the memory, the second communication being performed without using the authentication information.

BRIEF DESCRIPTION OF THE DRAWINGS

The particular features and advantages of the disclosure as well as other objects will become apparent from the following description taken in connection with the accompanying drawings, in which:

FIG. 2 is an explanation diagram illustrating a share table and a data table according to the embodiment;

FIG. 3 is a sequence diagram illustrating a process for sharing a folder;

FIG. 6 is a sequence diagram illustrating a process for sharing the folder; and

FIG. 7 is a sequence diagram illustrating a process for sharing an existing folder.

DETAILED DESCRIPTION (Configuration of System)

Figure 1:
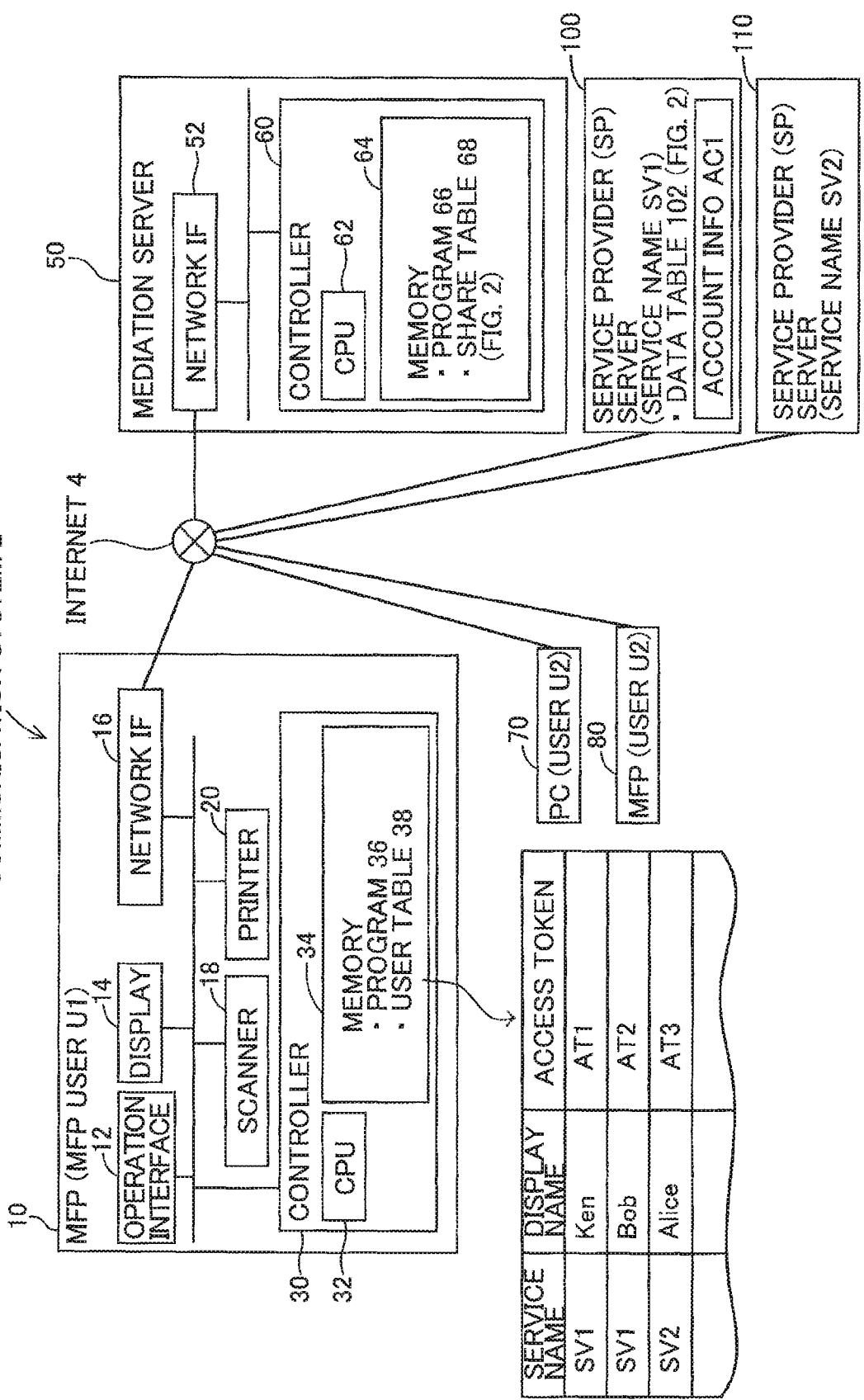
FIG. 1 is a block diagram illustrating configuration of a communication system according to an embodiment.

As shown in FIG. 1, a communication system 2 includes MFPs (multifunction peripherals) 10 and 80, a mediation server 50, a PC (Personal Computer) 70. The MFP 10 is a machine used by at least one user including a user U1. The PC 70 and the MFP 80 are machines used by at least one user including a user U2 who is different from the user U1. The MFPs 10 and 80, the PC 70, and the mediation server 50 can communicate with each other via Internet 4. SP (service provider) servers 100 and 110 are connected to the Internet 4. The MFPs 10 and 80, the PC 70, and the mediation server 50 can communicate with each of the SP servers 100 and 110.

(Structure of MFP 10)

The MFP 10 is a peripheral equipment of the PC 70 and capable of executing various functions including printing function and scanning function. The MFP 10 includes an operation interface 12, a display 14, a network interface (IF) 16, a scanner 18, a printer 20, and a controller 30.

The operation interface 12 includes a plurality of keys. The user inputs various instructions into the MFP 10 by operating the operation interface 12. The display 14 is for displaying various information. The display 14 is a touch panel and thus has a function as an operation interface. In the following descriptions, "the operation interface 12" indicates the operation interface 12 itself and/or the combination of the operation interface 12 and the touch panel of the display 14. The network IF 16 is connected to the Internet 4 via a LAN (Local Area Network) (not shown). The scanner 18 is a scanning mechanism including CCD or CIS. The printer 20 is a printing mechanism in an inkjet method or a laser method.

The controller 30 includes a CPU 32 and a memory 34. The memory 34 stores a program 36 and a user table 38. The CPU 32 performs various processes according to the program 36.

A plurality of records is registered in the user table 38. Each record includes a service name, a display name, and an access token associated with each other. These sets of data are used when the user receives a service from one SP server (for example, the SP server 100) via the MFP 10. The service name is a name of the service provided by the SP server (100 or 110, for example). The service names "SV1" and "SV2" indicate service names of the SP servers 100 and 110, respectively. The display name is a user name displayed on the MFP 10. The access token is authentication information for using one of the SP server 100 and 110. The followings explain a method for registering in the user table 38 pieces of information ("SV1", "Ken", and "AT1") which are used when the user U1 corresponding to the display name "Ken" receives a service from the SP server 100.

The user U1 registers account information AC1 including an account name and a password in the SP server 100 by using a communication apparatus such as a PC or a smartphone. Subsequently, the user U1 accesses to the mediation server 50 by using the communication apparatus, and acquires a URL (Uniform Resource Locator) for accessing the SP server 100. Further, the user U1 accesses to the SP server 100 via the communication apparatus by using the URL, and inputs the account information AC1 into the SP server 100 for executing authentication procedures. When the authentication procedures are successful, the SP server 100 generates an access token AT1 corresponding to the account information AC1, and supplies the mediation server 50 with the access token AT1. When the access token AT1 is received from the SP server 100, the mediation server 50 generates a temporary ID corresponding to the access token AT1, and supplies the communication apparatus with the temporary ID. Accordingly, the temporary ID is displayed on the communication apparatus.

Subsequently, the user U1 inputs the service name "SV1", the display name "Ken", and the temporary ID in the MFP 10 by using the operation interface 12 of the MFP 10. In this case, the MFP 10 supplies the inputted temporary ID with the mediation server 50, and acquires the access token AT1 corresponding to the temporary ID from the mediation server 50. The MFP 10 registers, as an record, the inputted service name "SV1", the inputted display name "Ken", and the acquired access token "AT1" associated to each other in the user table 38. Other records are registered in the user table 38 similarly.

(Structures of PC 70 and MFP 80)

The PC 70 is a terminal device, such as a desktop PC, a tablet PC, and a notebook PC. The MFP 80 has a structure the same as the MFP 10. None of the PC 70 and the MFP 80 stores a table having the same configuration of the user table 38 stored in the MFP 10. In other words, the user U2 using the PC 70 and the MFP 80 does not perform an advanced registration (or preparation) of account information in the server 100 or 110. That is, the PC 70 and the MFP 80 cannot directly access to the SP server 100 or 110.

(Structure of Mediation Server 50)

The mediation server 50 is located on the Internet by a vender of the MFPs 10 and 80. The mediation server 50 mediates provision (or supply) of the service from each of the SP severs 100 and 110 to each of the MFPs 10 and 80. The mediation server 50 includes a network interface (IF) 52 and a controller 60. The network IF 52 is connected to the Internet 4.

The controller 60 includes a CPU 62 and a memory 64. The memory 64 stores a program 66 and a share table 68 (FIG. 2). The CPU 62 performs various processes according to the program 66.

(Structure of Service Provider Servers 100 and 110)

Each of the SP servers 100 and 110 is a third party server of services, such as, "Evernote (registration trademark)", "Google ((registration trademark)) Docs", "PICASA (registration trademark)", and "FACEBOOK (registration trademark)". Each of the SP servers 100 and 110 can provide services to various communication apparatuses such as the MFP 10.

The SP server 100 stores a data table 102 (FIG. 2), and can provide a first service to store image file(s) acquired from a communication apparatus in the data table 102. The SP server 100 can further provide a second service to provide the communication apparatus with the image file(s) stored in the data table 102. For the communication apparatus (or for user), the first service is an upload service for uploading the image file(s) to the SP server 100, and the second service is a download service for downloading the image file(s) from the SP server 100. For example, the MFP 10 can perform a download (DL) print in which the image file is downloaded from the SP server 100 and an image represented by the downloaded image file is printed. Further, the MFP 10 can perform a scan upload (UL) in which a scan image file generated by scanning an image is uploaded to the server 100. The SP server 110 can perform services the same as those of the SP server 100.

(Contents of Share Table 68, FIG. 2)

As shown in FIG. 2, a plurality of records including records 68a and 68b is registered in the share table 68. Each records correlates a service name, a display name, an access token, a member address, a sharing target, an execution authority, an expiration date, and a share ID. The record 68a is information that is used when a user (for example, a user U2), which is different from the user U1 corresponding to the display name "Ken" in the record 68a, uses a file or folder in the SP server 100 which corresponds to the account information AC1 for the user U1. When the record 68a is registered in the table 68, a user different from the user U1 can use the file or folder in the server 100 without registering his or her account information in the SP server 100. More generally, the record 68a is information for sharing the file or folder in the SP server 100 by the user U1 and another user. The record 68b has essentially the same structure of the record 68a. In the following descriptions, another user who can share the sharing target explained above is referred to as a "member" of a group for sharing.

The member address is an email address of the member of the group for sharing. The sharing target indicates a folder or a file that the member can use. The folder ID "F1" and the file ID "Img01" indicate a folder ID of the sharing target and the file ID of the sharing target, respectively. The execution authority indicates a service that the member can receive. One of the services "UL", "DL", and "UL/DL" can be set as the execution authority. The service "UL" indicates an upload service for uploading an image file to the folder set as the sharing target. The service "DL" indicates an download service for downloading files in the folder set as the sharing target or the file set as the sharing target. The service "UL/DL", which is registered in the record 68a, indicates that both of the uploading service and a downloading service can be received. When the file is set as the sharing target (see the record 68b), the execution authority can be set to the "DL" only. The expiration date is a time by which the member can receive the service. That is, the expiration data indicates a period during which the member can receive the service. In the followings, the combination of the member address, the sharing target, the execution authority, and the expiration date is referred to as "share information", and a combination of the sharing target, the execution authority, and the expiration date is referred to as "condition information". The share ID is identification information for identifying a record in the share table 68 such as the record 68a or 68b.

(Contents of Data Table 102, FIG. 2)

A plurality of records is registered in the data table 102 stored in the PS server 100. Each record includes (ore retains) the account information, the access token, and uploaded data associated with each other. As described above, the account information is registered by the user. The access token is supplied to the mediation server 50 when the authentication of the account information is succeeded. The uploaded data includes at least one folder (folders 200 and 300 for example), and at least one image file (image files 202, 204, 302, and 304, for example) stored in each folder. In the modification, each folder may include not only a file in an image file format but also a file in a format other than the image file format, such as a document file format (PDF file for example).

Each folder is assigned with a folder name ("FN1" for example) and a folder ID ("F1" for example). The folder name is a name of the folder and designated by the user when the folder is newly stored in the SP server 100, for example. The folder ID is an identifier for identifying the folder. The folder ID is generated by the SP server 100 when the folder is newly stored in the SP server 100. Each image file is assigned with a file name ("IN01" for example) and a file ID ("Img01" for example). The file name is a name of the image file and designated by the user when the image file is generated. The file ID is an identifier for identifying the image file. The file ID is generated by the SP server 100 when the image file is uploaded to the server 100.

Figure 4:
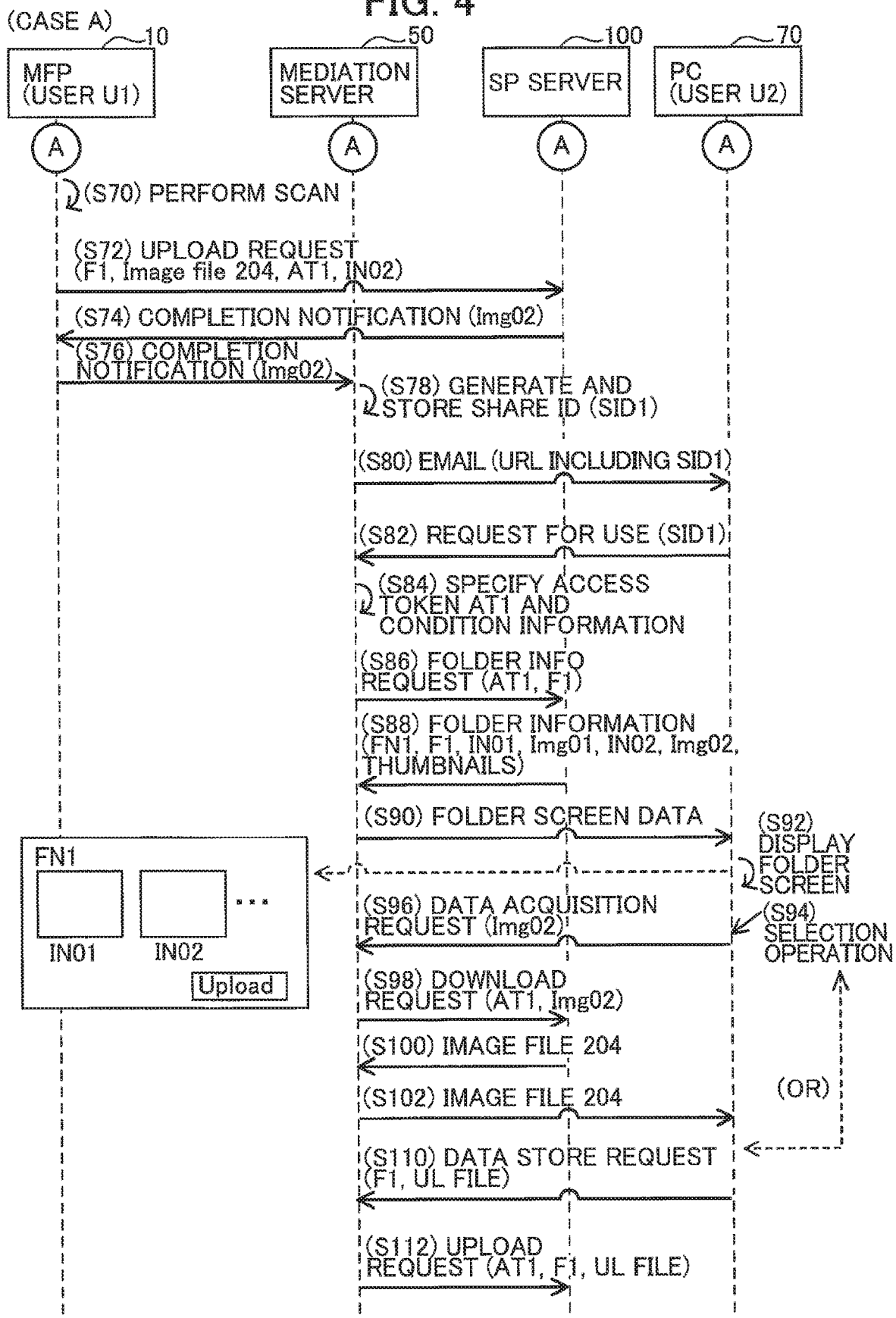
FIG. 4 is a sequence diagram illustrating a process subsequent to the process shown in FIG. 3.

(Case A where the Folder is Shared, FIGS. 3 and 4)

A scan upload process will be explained while referring to FIGS. 3 and 4. In the scan upload (UL) process, the user U1 uploads an image file, which is generated by scanning an image, to the SP server 100 by using the MFP 10. A followings explain a process allowing the user U2, who is a member sharing the sharing target, to use the folder that is the upload destination of the image file.

In S10 the user U1 performs a prescribed Web button operation for transmitting a Web start request to the mediation server 50 by using the operation interface 12 of the MFP 10. In S12 the CPU 62 of the mediation server 50 receives the Web start request from the MFP 10 via the network IF 52. Because each communication by the mediation server 50 is always performed by the network IF 52, the expressions "via the network IF 52" will be abbreviated in the following explanations regarding communication by the mediation server 50.

In S20 the CPU 62 transmits a prescribed Web screen data to the MFP 10 so that in S22 the display 14 of the MFP 10 displays the prescribed Web screen (see FIG. 3) represented by the prescribed Web screen data. The Web screen includes a plurality of function selection buttons for selecting one function name such as "Scan UL", "DL (download) print", "execution of sharing", and "sharing settings". When the "Scan UL" or the "DL print" is selected, a service name selection button for selecting a service name and a display name selection button for selecting a display name are further displayed in the prescribed screen. The service name selection button indicates a plurality of service names previously stored in the MFP 10, such as "SV1" and "SV2". Accordingly, the user can select one service ("SV1" for example). The display selection button indicates at least one display name ("Ken" or "Bob" for example) associated with the selected service name ("SV1" for example). Accordingly, the user can select a display name of the user. In this example, in S24 the user U1 selects the function name "Scan UL", the service name "SV1", and the display name "Ken".

In S26 the CPU 62 receives the function name "Scan UL", the service name "SV1", and the display name "Ken" from the MFP 10. In S28 the CPU 62 transmits to the MFP 10 an AT (Access Token) request for requesting transmission of an access token associated with both the received service name "SV1" and the received display name "Ken". As a result, in S30 the CPU 62 receives from the MFP 10 a request for use including the access token "AT1" associated to both the service name "SV1" and the display name "Ken". In S32 the CPU 62 stores the access token AT1 in the memory 64.

In S34 the CPU 62 transmits a data request including the access token AT1 to the SP server 100 corresponding to the service name "SV1" that was received in S26. The data request is a command for requesting transmission of at least one piece of folder information for at least one folder associated to the access token AT1. As a result, in S36 the CPU 62 receives from the SP server 100 the at least one piece of folder information for at least one folder associated to the access token AT1. Each piece of folder information includes a folder name and a folder ID ("FN1" and "F1" for example, see the data table 102 shown in FIG. 2).

In S38 the CPU 62 generates folder screen data by using (or including) the received at least one piece of folder information, and transmits the folder screen data to the MFP 10. As a result, in S40 the display 14 displays a folder screen represented by the folder screen data. The folder screen is a screen for selecting one folder name among at least one folder name ("FN1" and "FN2" for example). In S42 an operation for selecting one folder name ("FN1" in this example) is performed via the operation interface 12 by the user U1 in order to transmit an folder ID corresponding to the selected folder name. Accordingly, in S44 the CPU 62 receives from the MFP 10 the folder ID "F1" corresponding to the selected folder name "FN1".

In S46 the CPU 62 generates share information screen data by using (or including) the received folder ID "F1", and transmits the share information screen data to the MFP 10. As a result, in S48 the display 14 displays a share information screen represented by the share information screen data. The share information screen includes fields for inputting share information such as a member address, a sharing target, an execution authority, and an expiration date. By using the field for inputting the sharing target, either one of the folder "FN1" selected in S42 (that is, the folder ID "F1") and the file to be uploaded to the SP server 100 later (see "UL file" in FIG. 3) can be selected. By using the field for inputting the execution authority, either one of the "DL/UL", "UL", and "DL" can be selected. In S50 the user U1 inputs the share information to the MFP 10. In this example, the user U1 inputs the member address "xxx@xxx.com", the sharing target "F1", the sharing authority "UL/DL" and the expiration date "2016.xx.xx" in the MFP 10. The member address "xxx@xxx.com" is an email address set to the PC 70 that is used by the user U2.

In S52 the CPU 62 receives from the MFP 10 a registration request including the inputted share information. The registration request is a command for requesting to register the share information to the share table 68 in the memory 64. In S54 the CPU 62 registers in the share table 68, each information received in S26 (the service name "SV1" and the display name "Ken"), the access token AT1 received in S32, and the share information in the registration request, so as to be associated with each other as a part of a record 68a. Accordingly, all the information except the share ID for the record 68a shown in FIG. 2 is registered in the share table 68.

In S56 the CPU 62 transmits a function execution instruction to the MFP 10. The function execution instruction is a command for instructing an execution of a function indicated by the function name ("Scan UL" in this example) received in S26.

Accordingly, in S70 of FIG. 4, the MFP 10 performs scanning operation to generate an image file 204. In S72 the MFP 10 directly transmits an upload request to the SP server 100 without using the mediation server 50. Here, the upload request includes the folder ID "F1" transmitted to the CPU 62 in S44, the image file 204, the file name "IN02" which is assigned to the image file 204 by the MFP 10, and the access token AT1 transmitted to the CPU 62 in S30. The upload request is a command for requesting that the SP server 100 store the image file 204 in the folder 200 (see FIG. 2) identified by the folder ID "F1". In a conceivable case where in S70 the image file 204 goes through the mediation server 50 to reach the SP server 100, the image file 204 which may be personal image file for a user would transmitted to the mediation server 50, thereby giving discomfort to the user. In the embodiment, the image file 204 does not go through the mediation server 50, thereby preventing from giving discomfort to the user. However, as a modification, in S70 the image file 204 may go through the mediation server 50 to reach the SP server 100.

In response to reception of the upload request transmitted from the MFP in S72, the SP server 100 authenticates the access token AT1 included in the upload request, and subsequently stores the image file 204 in the folder 200. The SP server 100 generates a file ID "Img02" for the image file 204, and correlates the file ID "Img02" to the image file 204. In S74 the SP server 100 transmits to the MFP 10 a completion notification without using the mediation server 50. The completion notification includes the file ID "Img02" and is for notifying that the upload of the image file 204 is complete.

In S76 the CPU 62 receives from the MFP 10 the completion notification including the file ID "Img02". In S78 the CPU 62 generates a share ID ("SID1" in this example), and registers the share ID in the record 68a so that the share ID is associated to each information in the record 68a stored in S54 in the share table 68. Accordingly, the registration of the record 68a in the share table 68 is complete. In S80 the CPU 62 generates a URL (Uniform Resource Locater) including the share ID "SID1" generated in S78. Specifically, this URL includes a server URL that is a URL of the mediation server 50, and the share ID described in a query portion subsequent to the server URL. The CPU 62 generates an email including a mail body in which the generated URL including the share ID are described, and transmits the email while setting a transmission destination to the member address included in the record 68a (that is, an email address of the PC70). Accordingly, a display (not shown) of the PC 70 can display the email. Here, the email does not include the access token AT1 so that the user U2, who is different from the user U1, can be prevented from using the access token AT1.

After the PC 70 receives the email transmitted in S80, the PC 70 displays the URL included in the mail body. Accordingly, the user U2 can perform access operation (click operation of the URL, for example) for accessing the URL including the share ID "SID1" by using the PC 70. As a result, in S82 the PC 70 transmits a request for use including the share ID "SID1" to the mediation server 50. The request for use is a command for requesting that the mediation server 60 transmit information concerning the folder or the file within a permitted range defined by the share information associated to the share ID "SID1".

In response to reception of the request for use transmitted from the PC 70 in S82, in S84 the CPU 62 specifies the access token AT1 and condition information (that is, the sharing target, the execution authority, and the expiration date), which are associated to the share ID "SID1" included in the request for use, by referring to the share table 68. In this case, the CPU 62 determines that a present time does not reach the specified expiration date. However, when the present time has reached the specified expiration date, the CPU 62 ends the process without performing the process S86 and processes subsequent to S86. That is, the process is terminated with error.

In S86 the CPU 62 specifies the folder ID "F1" which is the sharing target associated to the share ID "SID1" included in the request for use. Further, the CPU 62 transmits folder information request to the SP server 100. Here, the folder information request includes the access token AT1 specified in S84, and the presently specified folder ID "F1". The folder information is a command for requesting that the SP server 100 transmit folder information (the folder name and the folder ID of the folder 200, the file names and the file IDs of all the image files 202 and 204 included in the folder 200, and thumbnail images of all the image files 202 and 204 included in the folder 200) regarding the folder 200 identified by the folder ID "F1". In response to reception of the folder information request, the SP server 100 authenticates the access token AT1, and transmits the folder information regarding the folder 200 to the mediation server 50 by referring to the data table 102.

In S88 the CPU 62 receives the folder information regarding the folder 200 from the SP server 100. In this example, the folder information includes the folder name "FN1", the folder ID "F1", the file name "IN01", the file ID "Img01", the file name "IN02", the file ID "Img02", and the thumbnail images of the image files 202 and 204. In S90 the CPU 62 generates folder screen data by using (or including) the folder information received in S88 and transmits the folder screen data to the PC 70. Accordingly, in S92 the CPU 62 can allow the display (not shown) in the PC 70 to a folder screen represented by the folder screen data.

In response to reception of the folder screen data, in S92 the PC 70 displays the folder screen. The folder screen includes the folder name "FN1", icons of the image files 202 and 204 (that is, thumbnail images and file names), an upload button for instructing execution of the upload function. The folder screen does not include information regarding the folder 300 (see the data table 102 shown in FIG. 2) that is not included in the sharing target, or that is out of the range permitted by the condition information associated to the share ID "SID1". Accordingly, the user U2 can be prevented from accessing to the folders and the files which are not the sharing target. In S94 the user U2 performs operation to select the file name "IN02" in order to transmit data acquisition request to the mediation server 50 from the PC 70.

In S96 the CPU 62 receives the data acquisition request including the file ID "Img02" corresponding to the selected file name "IN02". The data acquisition request is a command for requesting that the mediation server 50 acquire the image file 204 identified by the file ID "Img02".

In S98 the CPU 62 transmits a download request to the SP server 100. The download request includes the access token AT1 specified in S84, the file ID "Img02" received in S96. The download request is a command for requesting that the SP server 100 transmit the image file 204 identified by the file ID "Img02". As a result, in S100 the CPU 62 receives the image file 204 from the SP server 100. In S102 the CPU 62 transits the received image file 204 to the PC 70. As described above, in the embodiment, the CPU 62 transmits the download request in S98 without transmitting the access token AT1 to the PC 70 after receiving the data acquisition request in S96.

The PC 70 can download the image file 204 stored in the SP server 100 via the mediation server 50 by executing the processes S82-S102. Even if the user U2 does not register account information of the user U2 in the SP server 100 or the user U2 does not directly access to the SP server 100, the user U2, who is the member sharing the sharing target, can download the image file 204 corresponding to the account information AC1 that is for the user U1.

In a conceivable case where the mediation server 50 transmits the access token AT1 to the PC 70 in response to reception of the data acquisition request in S96, the PC 70 can directly download the image file 204 from the SP server 100 without using the mediation server 50. However, in this case, the access token AT1, which is for the user U1, is used by the user U2 different from the user U1. In the embodiment, in order to avoid such a situation, the mediation server 50 meditates supply of the image file 204 from the SP server 100 to the PC 70.

While the folder screen is displayed on the PC 70 in S92, the user U2 can perform selection operation for selecting the upload button in S110, instead of the selection operation for selecting the file name "IN02" in S94. In this case, the user U2 can further operate the PC 70 to perform selection operation for selecting an image file that is the upload target stored in the PC 70 (hereinafter, referred to as a UL file).

In S110, the CPU 62 receives a data store request from the PC 70. The data store request, which is generated by the PC70 by using the folder screen data, includes the folder ID "F1" indicating the folder 200 as the upload destination, and the UL file. The data store request is a command for requesting that the mediation server 50 allow the UL file to be stored in the folder 200 identified by the folder ID "F1". In this case, in S112 the CPU 62 transmits an upload request to the server 100. The upload request includes the access token AT1 specified in S84, the folder ID "F1" received in S110, and the UL file received in S110.

The PC 70 can upload the UL file to the SP server 100 via the mediation server 50 by executing S82-S92, S110, and S112. Even if the user U2 does not register his or her account information in the SP server 100, or the user U2 does not directly access to the SP server 100, the user U2, who is the member sharing the sharing target, can upload the UL file in the folder 200 corresponding to the account information AC1 that is for the user U1 by using the PC 70.

In the above described Case A (FIGS. 3 and 4), suppose a situation where the user U1 does not wish to share the folder 200 and etc. with the user U2, and wishes only the execution of the Scan UL. In this case, the user U1 does not input the share information in S50 (FIG. 3). As a result, in S52 the CPU 62 receives information indicating that the share information is not inputted, and performs none of the process S54 and process 78 and subsequent processes to S78 (FIG. 4).

Figure 5:
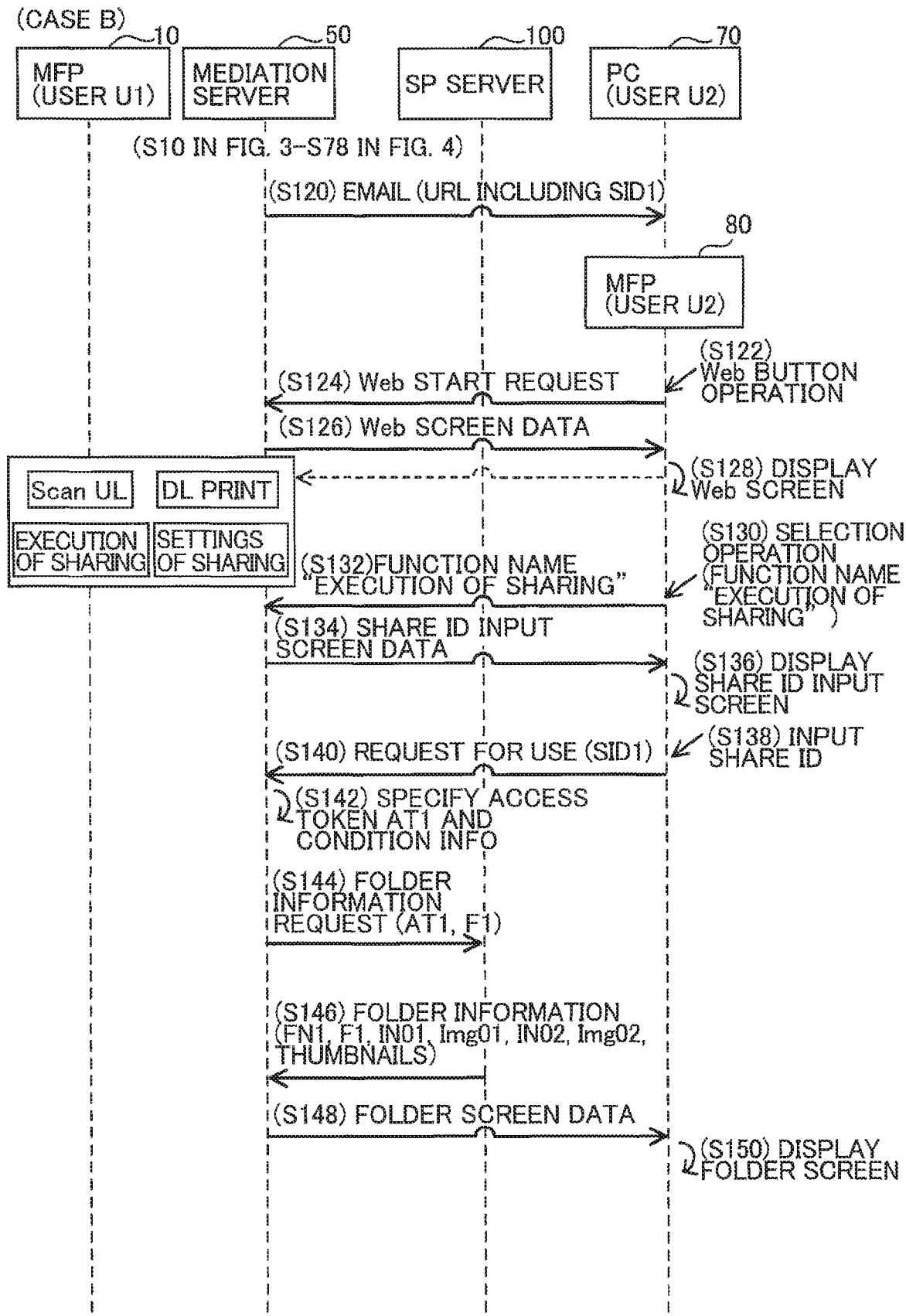
FIG. 5 is a sequence diagram illustrating a process for sharing the folder.

(Case B where the Folder is Shared, FIG. 5)

Another example (Case B) where the user U2, who is the member sharing the sharing target, uses the folder that is the upload destination of the image file will be explained while referring to FIG. 5. In Case B, the user U2 uses the folder by using the MFP 80 different from the PC 70.

Similarly to Case A, in Case B the processes from S10 shown in FIG. 3 to S78 shown in FIG. 4 are executed. Similarly to S80 (FIG. 4), in S120 the CPU 62 transmits to the PC 70 the email in which the URL including the share ID "SID1" is described. When the PC 70 displays the email, the user U2 can know the share ID "SID1". In S122 the user U2 inputs the Web button operation into the MFP 80, instead of the access operation for accessing to a target designated by the URL including the share ID by using the PC 70.

In S124 the CPU 62 receives the Web start request from the MFP 80. In S126 the CPU 62 transmits the Web screen data to the MFP 80 so that the MFP 80 displays the Web screen in S128. In S130 the user U2 selects a function name "execution of sharing".

In S132 the CPU 62 receives the function name "execution of sharing" from the MFP 80. In S134 the CPU 62 transmits share ID input screen data to the MFP 80 so that the MFP 80 displays a share ID input screen in S136. The share ID input screen is for inputting a share ID. In S138 the user U2 inputs the share ID "SID1" in the MFP 80 for transmitting a request for use.

In S140 CPU 62 receives the request for use including the share ID "SID1" from the MFP 80. Subsequent processes S142-S150 are performed similarly to the processes S84-S92 shown in FIG. 4. Further, in Case B the processes similar to the processes S94-S112 in Case A are performed subsequent to the process S15. For example, the MFP 80 can receive the image file 204 in the folder 200 from the SP server 100 via the mediation server 50 (see S96-S102), and print the image represented by the image file 204. That is, the MFP 80 can perform the DL print. Alternatively, the MFP 80 can generate the UL file by scanning the image, and upload the UL file in the folder 200 via the mediation server 50 (see S110 and S112). That is, the MFP 80 can perform the scan UL.

In Case B, the communication apparatus (that is the PC 70) that receives the email is different from the communication apparatus (that is the MFP 80) that transmits the share ID to the mediation server 50. In such a case, even if the user U2 does not register account information of the user U2 in the SP server 100 or the user U2 does not directly access to the SP server 100, the user U2 can receive services from the SP server 100 by using the MFP 80.

(Case C where the Folder is Shared, FIG. 6)

Case C where the user U2, who is the member sharing the sharing target, uses the uploaded image file will be explained while referring to FIG. 6.

In Case C the processes from S10 shown in FIG. 3 to S84 shown in FIG. 4 are performed in a basically same manner as Case A. However, the processes in Case C is different from the process in Case A as follows. That is, in Case C in S50 the "UL file" is inputted as a sharing target by the user U1. The "UL file" in the sharing target indicates that the uploaded file is shared. In this case, the user U1 can input the "DL" only as an execution authority. Subsequently, in S54 the CPU 62 stores, as a part of record 68b, share information in the share table 68 while the field of the sharing target remains blank. That is, at a timing when the S54 is executed, the record 68b in the share table 68 includes information other than the sharing target and the share ID.

In S78 the CPU 62 generates the share ID ("SID2" in this example), and registers the share ID associated to the pieces of registered information which was stored in the record 68b in SM. In this case, the CPU 62 further registers the file ID "Img02", which is included in the completion notification received in S76, as a sharing target in the record 68b. Accordingly, the complete record 68b is registered as shown in FIG. 2.

In S80 and S82, the share ID "SID2" is used in this example, instead of the share ID "SID1". In S84, by referring to the share table 68, the CPU 62 specifies the access token AT1 and the condition information (that is, the sharing target "Img02", the execution authority "DL", and the expiration date) associated to the share ID "SID2" which is included in the access request received in S82.

In S186 the CPU 62 transmits a file information request to the SP server 100. The file information request includes the access token AT1 specified in S84, and the file ID "Img02" specified in S84. The file information request is a command for requesting that the SP server 100 transmit file information (that is, the file name, the file ID, and the thumbnail image) regarding the image file 204 that is identified by the file ID "Img02". In response to reception of the file information request, the SP server 100 authenticates the access token AT1, and transmits the file information (that is, the file name "IN02", the file ID "Img02", and the thumbnail image) to the mediation server 50 by referring to the data table 102.

In S188 the CPU 62 receives the file information of the image file 204 (that is, the file name "IN02", the file ID "Img02", and the thumbnail image of the image file 204) from the SP server 100. In S190 the CPU 62 generates file screen data by using (or including) the file information, and transmits the file screen data to the PC 70. As a result, in S192 the display (not shown) of the PC 70 displays the file screen represented by the file screen data. The file screen includes an icon indicating the image file 204 (that is, the thumbnail image and the file name). The file screen does not include information about an image file or folder that is not included in the sharing target. The file screen does not include the upload button unlike S92 of FIG. 4. Accordingly, the user U2 can be prevented from using the function that is not included in the execution authority. In S194 the user U2 performs selection operation for selecting the file name "IN02". The processes S196-S202 are the same as the processes S96-S102 shown in FIG. 4.

In Case C, the PC 70 can download the image file 204 stored in the SP server 100 by using the mediation server 50. Even if the user U2 does not register account information of the user U2 in the SP server 100, the user U2, who is the member sharing the sharing target, can download the image file 204 corresponding to the account information AC1 for the user U1 by using the PC 70.

(Case D where the Folder is Shared, FIG. 7)

In Cases A-C, information for sharing the folder or the image file is registered in the share table 68 when the MFP 10 performs the scan UL. In Case D, the information for sharing is registered in the share table 68 at a timing independent from the Scan UL.

In Case D the processes from S10-S22 shown in FIG. 3 are performed in a same manner as Case A. In S324 the user U1 inputs selection operation for selecting the function name "sharing settings", the service name "SV1", and the display name "Ken" thorough the Web screen (see S22 of FIG. 3). In S326 the CPU 62 receives the function name "sharing settings", the service name "SV1", and the display name "Ken" from the MFP 10. The processes S328-S334 are the same as the processes S28-S34 shown in FIG. 3.

In S336 the CPU 62 receives from the SP server 100 at least one piece of folder information respectively for at least one folder (that is, folder name(s) and folder ID(s)) and at least one piece of file information respectively for at least one file (that is, file name(s) and file ID(s)) which are associated to access token AT1. As a modification, the CPU 62 may receive, from the SP server 100, either one of the (at least one piece of) folder information and the (at least one piece of) file information, which are associated to the access token AT1 in the data table 102, according to contents of uploaded data.

In S338 the CPU 62 generates target selection screen data using (or including) the at least one piece of folder information and the at least one piece of file information, and transmits the target selection screen data to the MFP 10. As a result, in S340, the display 14 of the MFP 10 displays a target selection screen represented by the target selection screen data. The target selection screen includes at least one folder name ("FN1" and "FN2" for example), and a file name ("IN01" and so on) of each file included in each folder. Accordingly, in S342 the user can select one folder name or one file name which is available for the member sharing the sharing target. In this example, the operation for selecting the folder name "FN1" is performed through the operation interface 12. In this case, in S344 the CPU 62 receives the folder ID "F1" corresponding to the selected folder name "FN1" from the MFP 10.

In S346 the CPU 62 transmits the share information screen data to the MFP 10. As a result, in S348 the display 14 of the MFP 10 displays the share information screen. In Case D, only the folder ID "F1" is previously inputted in a field for inputting the sharing target in the share information screen, unlike S48 shown in FIG. 3. In S350 the user U1 inputs the share information in the MFP 10.

The processes S352 and S354 are similarly performed to S52 and S54 shown in FIG. 3. In S378 the CPU 62 generates a share ID, and stores the share ID associated with each information stored in S354 in the share table 68. Accordingly, a new record is completely registered in the share table 68. Following to S378, the process S80 and processes subsequent to S80 shown in FIG. 4 are performed similarly to Case A.

As described above, the example where the folder 200 (that is the folder ID "F1") is shared is explained. However, a similar process is performed in a case where the image file 202 (that is, the file ID "Img01") is shared. In this case, in S342 operation for selecting the file name "IN01 is performed through the operation interface 12. Subsequently, in S344 the CPU 62 receives the file ID "Img01 corresponding to the file name "IN01" from the MFP 10. Other processes are similarly performed to those in the example where the folder 200 is shared.

In Case D, the user U1 can register information for sharing the folder or the image file in the share table 68 at different timing from the execution of the Scan UL by the MFP 10. Similarly to Cases A-C, even if the user U2 does not register account information of the user U2 in the SP server 100 or the user U2 does not directly access to the SP server 100, the user U2 can receive services from the SP server 100 by using the PC 70 or the MFP 80.

Advantages of the Embodiment

When the registration request is received from the MFP 10 (S52 of FIG. 3 or S352 of FIG. 7), the mediation server 50 registers the share ID "SID1" associated to the access token AT1 in the share table 68 (S78 of FIG. 4 or S378 of FIG. 7). The mediation server 50 transmits to the PC70 the email, in which the URL including the share ID is described, without outputting the access token AT1 (S80 of FIG. 4). When the request for use including the share ID "SID1" is received from the PC 70 or the MFP 80 (S82 of FIG. 4 or S140 of FIG. 5), the mediation server 50 performs each communication through the PC 70 or the MFP 80 receives the service from the SP server 100 (S86-S112 of FIG. 4 or S144-S150 of FIG. 5). In this case, the mediation server 50 performs communication using the access token AT1 with the SP server 100, but does not perform communication using the access token AT1 with the PC 70. Accordingly, the PC 70 can download the image file 204 from the SP server 100 via the mediation server 50 or can upload the UL file in the folder 200 via the mediation server 50. Accordingly, even if the user U2 does not register account information of the user U2 in the SP server 100 or the user U2 does not directly access to the SP server 100, the user U2 can receive services from the SP server 100 by using the PC 70 or the MFP 80.

(Correspondences)

The account information "AC1" shown in FIG. 2 is an example of specific account information. The access token "AT1" is an example of authentication information. The MFP 10 is an example of a first communication apparatus. The PC 70 or a combination of the PC 70 and the MFP 80 are examples of a second communication apparatus. The registration request of S52 in FIG. 3 is an example of a registration request. The request for use of S82 in FIG. 4 and the request for use of S140 in FIG. 5 are examples of a first utilization request. The request for use of S30 in FIG. 3 is an example of a second utilization request. The function execution instruction in S56 is an example of a process instruction. The folders 200 and 300 and the image files 202, 204, 302, and 304 are examples of a first utilization target. Here, the folders 200 and 300 may be referred to as a storage area, and the image files 202, 204, 302, and 304 may be referred to as a storage target. That is, the storage target may be a target to be stored in a service provider server, and the storage area may be an area to store the storage target. The folder 200 in Cases A, B, and D, and the image file 204 in Case C are examples of a second utilization target. The share ID is an example of identification information. Each communication executed in S86-S102 and S110-S112 shown in FIG. 4 is an example of mediation communication. Each communication executed in S86, S88, S98, S100, and S112 in FIG. 4 is an example of first communication. Each communication executed in S90, S96, S102, and S110 is an example of second communication. The folder information of S36 in FIG. 3, and the folder information and the file information of S336 in FIG. 7 are examples of relevant information. The upload requests of S72 in FIG. 4 and S172 in FIG. 6 are examples of a first storage request. The data store request of S110 in FIG. 4 is an example of a second storage request. The sharing target shown in FIG. 2 is an example of utilization target information. The URL including the share ID is an example of a character string.

While the disclosure has been described in detail with reference to the above embodiments, it would be apparent to those skilled in the art that various changes and modifications may be made thereto.

(Modification 1)

In S88 of FIG. 4, the CPU 62 of the mediation server 50 may receive folder information for all the folders stored in the SP server 100 and file information for all the image files stored in the SP server 100. In this case, in S90 the CPU 62 may generate folder screen data including folder information and file information respectively for only folders and files conforming the condition information (that is, the sharing target) specified in S84 among all the folders and the files included in the received folder information and the received file information. Subsequently, in S90 the CPU 62 may transmit the generated folder screen data to the PC 70. Similar processes may be performed in S188 and S190 shown in FIG. 6. More generally, a communication execution device (the controller 30) may perform mediation communication within a range depending on a condition indicated by the condition information associated to the identification information (the share ID) when the first utilization request including the identification information is received from the second communication apparatus.

(Modification 2)

In S52 of FIG. 3 the CPU 62 receives only the member address from the MFP 10 and does not receive the condition information (that is, the sharing target, the execution authority, and the expiration date). In this case, the CPU 62 may not register the condition information in the share table 68. In this case, the CPU 62 may register a predetermined condition information in S84 of FIG. 4 or in S184 of FIG. 6. The predetermined condition information may include a sharing target "folder IDs of all the folders corresponding to the access token AT1", the execution condition "DL", and the expiration date "one day", for example.

(Modification 3)

The user table 38 may not be stored in the memory 34 of the MFP 10. In this case, a table corresponding to the user table 38 (or an access token) may be stored in the memory 64 of the mediation server 50. In this case, when the access token is received from the SP server 100, the CPU 62 of the mediation server 50 may generate a table including the access token and store the generated table in the memory 64. In this modification, the processes S28 and S30 of FIG. 3, or the processes S328 and S330 of FIG. 7 may not be performed. This modification is an example of an "acquiring" process. In this modification, the CPU 62 may "acquire" the access token by reading the access token from the above described generated table stored in the memory 64.

(Modification 4)

The user table 38 (FIG. 1) may store records (information) so that each record includes the service name, the display name, and account information associated with each other. In S30 of FIG. 3 and in S330 of FIG. 7, the CPU 62 may receive the account information instead of the access token AT1 from the MFP 10. The processes subsequent to S30 or S330, the CPU 62 uses the account information instead of the access token AT1. The account information in this modification is an example of the authentication information.

(Modification 5)

In S80 of FIG. 4 or in S120 of FIG. 5, the CPU 62 may transmit to the PC 70 an email describing a character string indicating the share ID, instead of the URL of the mediation server 50 including the share ID. In this modification, after the user U2 accesses to the mediation server 50 by operating the PC 70, the user U2 inputs the share ID described in the email and transmits the share ID to the mediation server 50. Alternatively, in S80 of FIG. 4 or in S120 of FIG. 5, the CPU 62 may transmit to the PC 70 an email describing a short URL of the URL of the mediation server 50 including the share ID.

(Modification 6)

In S80 of FIG. 4 or in S120 of FIG. 5, the CPU 62 may transmit to the PC 70 the URL including share ID in a communication method other than transmitting the email to the PC 70. For example, the CPU 62 may transmit the URL including the share ID to an account of SNS (Social Networking Service) that the user U2 uses.

(Modification 7)

In S46 of FIG. 3 or in S346 of FIG. 7, the CPU 62 may generate share information screen data by using (or including) the received folder ID "F1" and at least one member address for at least one member sharing the sharing target which was previously stored in the memory 64 of the mediation server 50. In S48 of FIG. 3 or in S348 of FIG. 7, the share information screen may be configured so that the user can select one member address from the at least one member address.

(Modification 8)

The share table 68 may store execution restriction information instead of the execution authority. The execution restriction information indicates at least one service which the member sharing the sharing target cannot receive. That is, the member is prohibited from receiving the at least one service indicated by the execution restriction information. In this case, in S52 of FIG. 3 and in S352 of FIG. 7 the CPU 62 may receive the registration request which includes the execution restriction information instead of the execution authority. In S84 of FIG. 4, the CPU 62 may specifies at least one service that is not restricted by the execution restriction information. For example, the execution restriction information is the "UL", in S84 the CPU 62 specifies the "DL".

(Modification 9)

In the above embodiment, each process shown in FIGS. 3-7 is executed by executing processes which the CPU 62 of the mediation server 50 performs according to the software. Alternatively, at least part of the processes shown in FIGS. 3-7 may be performed by hardware such as a logical circuit.

The technical elements described in the present specification or drawings exhibit technical utility either independently or in various combinations and shall not be limited to the combinations set forth in the claims at the time of filing.

Further, the technology illustrated in the specification or drawings achieves multiple objects at the same time, and achieving one of the objects itself demonstrates technical utility.

What is claimed is:

1. A mediation server comprising:
a communication interface communicable with a service provider server, a first communication apparatus, and a second communication apparatus different from the first communication apparatus, the service provider server having a first utilization target associated with specific account information, the first utilization target including a second utilization target;
a processor; and
a memory storing computer-readable instructions therein, the computer-readable instructions, when executed by the processor, causing the mediation server to:
acquire authentication information associated with the specific account information, the authentication information being for the first communication apparatus to be authenticated for using the first utilization target including the second utilization target;
register identification information, the authentication information, and the second utilization target so as to be associated with each other in the memory in a case where a registration request is received from the first communication apparatus, the identification information being for using the second utilization target which is registered associated with the identification information and the authentication information;
output the identification information to an outputting destination without outputting the authentication information to the outputting destination;
after outputting the identification information, receive from the second communication apparatus a first utilization request including the identification information but not including the authentication information, specify the identification information included in the received first utilization request, and specify the registered second utilization target associated with the identification information included in the received first utilization request; and
perform, in a case where the first utilization request including the identification information is received from the second communication apparatus after outputting the identification information, mediation communication in which a specific service from the service provider server to the second communication apparatus is mediated by transmitting the authentication information to the service provider server from the mediation server under a condition that it is specified that the identification information is included in the received first utilization request, not including the authentication information, and the registered second utilization target is associated with the identification information included in the received first utilization request, the specific service using the second utilization target, which is associated with the identification information included in the received first utilization request, in the service provider server, the transmitting the authentication information prompting the service provider server to execute authentication, wherein the mediation communication includes first communication between the communication interface and the service provider server, and second communication between the communication interface and the second communication apparatus, the first communication including the transmitting the authentication information to the service provider server, and the second communication being performed without requiring the second communication apparatus to provide the authentication information in order to use the second utilization target,
wherein the second communication includes reception of a first file from the second communication apparatus,
wherein the first communication further includes transmission of a first storage request to the service provider server, the first storage request being for requesting to store the first file in a first folder which is the second utilization target, the first storage request including the first file and the authentication information.

2. The mediation server according to claim 1, wherein the first communication includes transmission of a file request including the authentication information to the service provider server, and reception of a second file from the service provider server in response to the file request, the second file being included in the second utilization target,
wherein the second communication includes transmission of the second file to the second communication apparatus.

3. The mediation server according to claim 2, wherein the first utilization target includes a second folder,
wherein the mediation server is further configured to:
receive relevant information concerning the first utilization target from the service provider server by using the authentication information in a case where a second utilization request is received from the first communication apparatus; and
transmit a process instruction to the first communication apparatus by using the relevant information, the process instruction being for instructing the first communication apparatus to transmit a second storage request to the service provider server without using the mediation server, wherein the second storage request is for requesting the service provider server to store the second file in the second folder of the service provider server, the second file being presently stored in the first communication apparatus, the second storage request including the second file and the authentication information, and
wherein in the mediation communication, communication regarding the second file as the second utilization target is performed in a case where the first utilization request is received from the second communication apparatus after the second file is stored in the second folder and the identification information is outputted.

4. The mediation server according to claim 1, wherein the registering further includes registering, in the memory, condition information received from the first communication apparatus in a case where the registration request is received, the condition information indicating a condition for executing the mediation communication, wherein the condition information, the identification information, and the authentication information are registered associated with one another in the memory,
wherein in the case where the first utilization request including the identification information is received from the second communication apparatus, the mediation communication is performed within a range permitted by the condition information associated with the identification information.

5. The mediation server according to claim 4, wherein the condition information includes utilization target information indicating the second utilization target,
    wherein in the mediation communication, in a case where a scope defined by the second utilization target is smaller than that by the first utilization target, communication for the second communication apparatus to use the second utilization target is performed while the second communication apparatus is prohibited from using any utilization target which is included in the first utilization target and is other than the second utilization target indicated by the utilization target information.

6. The mediation server according to claim 5, wherein the condition information includes communication information that indicates at least one of a first type communication and a second type communication, the first type communication being transmission of a file to the second communication apparatus from the service provider server via the mediation server, the second type communication being transmission of a file to the service provider server from the second communication apparatus via the mediation server,
    wherein in the mediation communication, communication indicated by the communication information is performed while any communication that is not indicated in the communication information is prohibited.

7. The mediation server according to claim 1, wherein the acquiring includes acquiring the authentication information from the first communication apparatus.

8. The mediation server according to claim 1, wherein the mediation server is further configured to perform receiving address information indicating the outputting destination in a case where the registration request is received,
    wherein the output outputs the identification information to the outputting destination to allow a display of the outputting destination to display the identification information.

9. The mediation server according to claim 8, wherein the outputting further outputs a character string including location information of the mediation server and the identification information to allow the display of the outputting destination to display the character string.

10. A non-transitory computer readable storage medium storing a set of program instructions thereon that, when executed by a computer for controlling a mediation server, which is communicable with a service provider server having a first utilization target associated with specific account information, a first communication apparatus, and a second communication apparatus different from the first communication apparatus, the set of program instruction comprising:
    acquiring authentication information associated with the specific account information, the authentication information being for the first communication apparatus to be authenticated for using the first utilization target, the first utilization target including a second utilization target;
    registering identification information, the authentication information, and the second utilization target associated with each other in a memory in a case where a registration request is received from the first communication apparatus, the identification information being used for using the second utilization target which is registered associated with the identification information and the authentication information;
    outputting the identification information to an outputting destination without outputting the authentication information to the outputting destination;
    after outputting the identification information, receiving from the second communication apparatus a first utilization request including the identification information but not including the authentication information, specifying the identification information included in the received first utilization request, and specify the registered second utilization target associated with the identification information included in the received first utilization request; and
    performing, in a case where the first utilization request including the identification information is received from the second communication apparatus after outputting the identification information, mediation communication in which a specific service from the service provider server to the second communication apparatus is mediated by transmitting the authentication information to the service provider server from the mediation server under a condition that it is specified that the identification information is included in the received first utilization request, not including the authentication information, and the registered second utilization target is associated with the identification information included in the received first utilization request, the specific service using the second utilization target, which is associated with the identification information included in the received first utilization request, in the service provider server, the transmitting the authentication information prompting the service provider server to execute authentication, wherein the mediation communication includes first communication between a communication interface of the mediation server and the service provider server, and second communication between the communication interface and the second communication apparatus, the first communication including the transmitting the authentication information to the service provider server, and the second communication being performed without requiring the second communication apparatus to provide the authentication information in order to use the second utilization target,
    wherein the second communication includes reception of a file from the second communication apparatus,
    wherein the first communication further includes transmission of a storage request to the service provider server, the storage request being for requesting to store the file in a folder which is the second utilization target, the storage request including the file and the authentication information.

11. A mediation server comprising:
    a communication interface configured to communicate with a service provider server, a first communication apparatus, and a second communication apparatus different from the first communication apparatus, the service provider server having a first utilization target associated with specific account information, the first utilization target including a second utilization target;
    a memory;
    acquiring means for acquiring authentication information associated with the specific account information, the authentication information being for the first communication apparatus to be authenticated for using the first utilization target, the first utilization target including a second utilization target;
    registering means for registering identification information, the authentication information, and the second utilization target associated with each other in a memory in a case where a registration request is received from the first communication apparatus, the identification information being used for using the second utilization target which is registered associated with the identification information and the authentication information;

outputting means for outputting the identification information to an outputting destination without outputting the authentication information to the outputting destination;

receiving means for, after outputting the identification information, receiving from the second communication apparatus a first utilization request including the identification information but not including the authentication information, specifying the identification information included in the received first utilization request, and specifying the registered second utilization target associated with the identification information included in the received first utilization request; and performing means for performing, in a case where the first utilization request including the identification information is received from the second communication apparatus after outputting the identification information, mediation communication in which a specific service from the service provider server to the second communication apparatus is mediated by transmitting the authentication information to the service provider server from the mediation server under a condition that it is specified that the identification information is included in the received first utilization request, not including the authentication information, and the registered second utilization target is associated with the identification information included in the received first utilization request, the specific service using the second utilization target, which is associated with the identification information included in the received first utilization request, in the service provider server, the transmitting the authentication information prompting the service provider server to execute authentication, wherein the mediation communication includes first communication between the communication interface and the service provider server, and second communication between the communication interface and the second communication apparatus, the first communication including the transmitting the authentication information to the service provider server, and the second communication being performed without requiring the second communication apparatus to provide the authentication information in order to use the second utilization target, wherein the second communication includes reception of a file from the second communication apparatus, wherein the first communication further includes transmission of a storage request to the service provider server, the storage request being for requesting to store the file in a folder which is the second utilization target, the storage request including the file and the authentication information.

12. The mediation server according to claim 1, wherein the first communication apparatus is an image processing apparatus.

13. The mediation server according to claim 1, wherein the second communication apparatus is a terminal device.

14. The mediation server according to claim 1, wherein the specific service is related to an image process.

* * * * *